(No Model.) 2 Sheets—Sheet 1.

F. H. ZOHE.
LAWN MOWER.

No. 534,187. Patented Feb. 12, 1895.

Witnesses:
Robert Errett
Geo. W. Rea.

Inventor:
Florence H. Zohe.
By James L. Norris
Atty.

(No Model.) 2 Sheets—Sheet 2.
F. H. ZOHE.
LAWN MOWER.
No. 534,187. Patented Feb. 12, 1895.
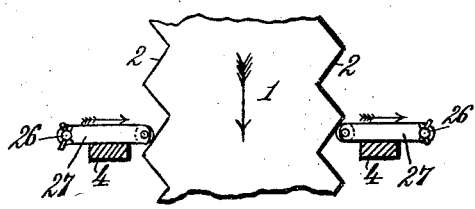
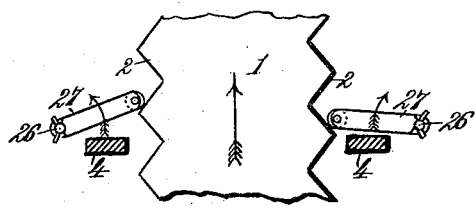
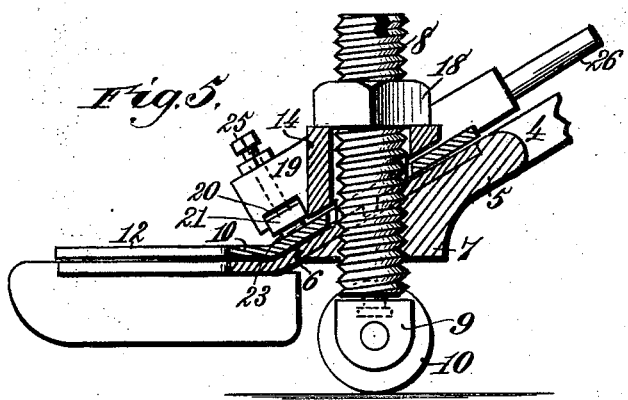
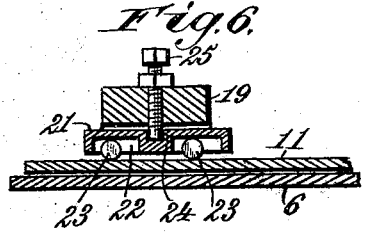
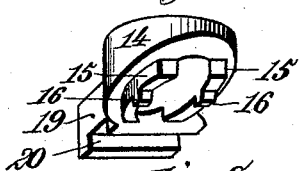
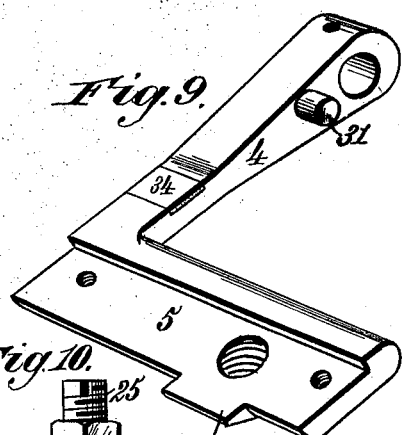
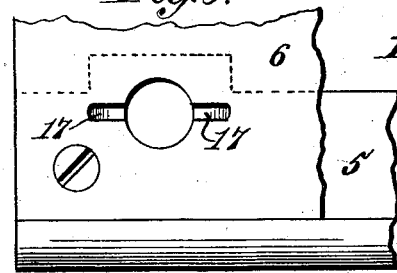
Witnesses.
Robert Evrutt,
Geo. W. Rea.
Inventor:
Florence H. Zohe.
By James L. Norris,
Atty.

UNITED STATES PATENT OFFICE.

FLORENCE H. ZOHE, OF SCRANTON, PENNSYLVANIA.

LAWN-MOWER.

SPECIFICATION forming part of Letters Patent No. 534,187, dated February 12, 1895.

Application filed August 25, 1894. Serial No. 521,328. (No model.)

*To all whom it may concern:*

Be it known that I, FLORENCE H. ZOHE, a citizen of the United States, residing at Scranton, in the county of Lackawanna and State of Pennsylvania, have invented new and useful Improvements in Lawn-Mowers, of which the following is a specification.

This invention relates to improvements in lawn mowers, and has for its object to provide a mower of this class that shall be simple in construction and efficient in operation; that will not be liable to get out of order or become clogged, and in which the noise of the operative parts is reduced to a minimum.

To these ends my invention consists in the novel features of construction, and the combination and arrangement of parts hereinafter fully described and claimed, due reference being had to the accompanying drawings forming a part of this specification, wherein—

Figure 1:
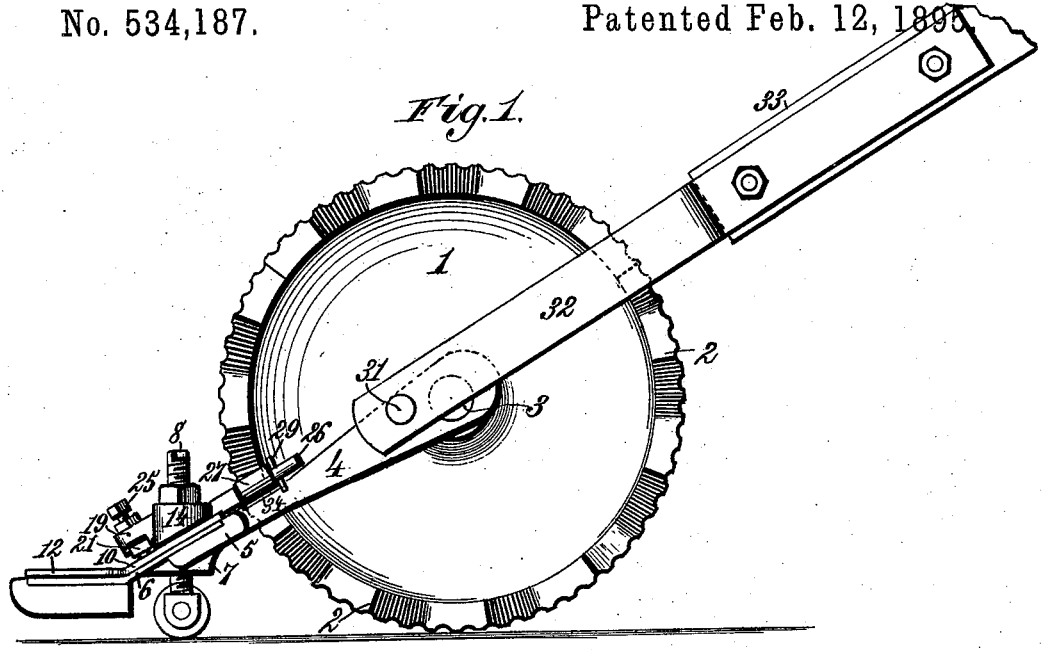
Figure 2:
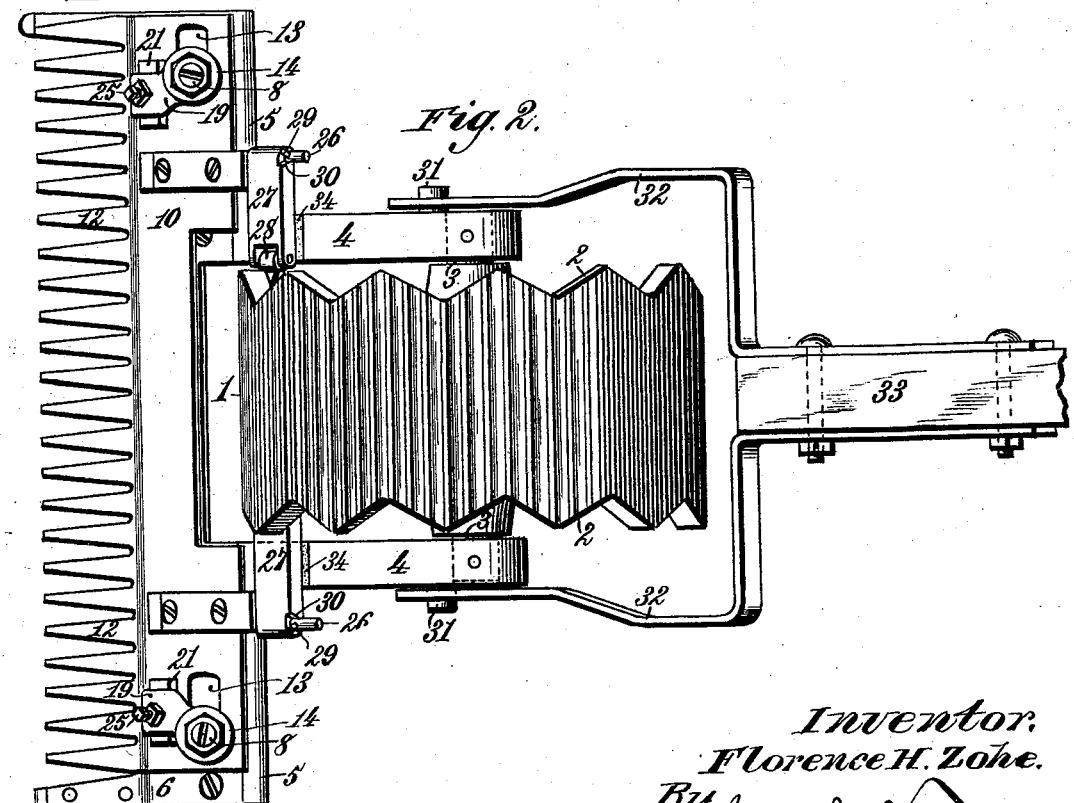

Figure 1, is a side elevation of my improved lawn mower. Fig. 2, is a plan view thereof. Figs. 3 and 4 are diagram views illustrating the operation of the driving mechanism. Fig. 5, is a detail sectional view of the means for adjusting the finger-bar. Fig. 6, is a similar view of the means for adjusting the cutter-bar. Fig. 7, is a detail perspective view of one of the adjusting boxes. Fig. 8, is a detail view of one end of the finger bar. Fig. 9, is a detail perspective view of one of the side bars composing the frame. Fig. 10, is a detail sectional view of a modified form of frictional bearing for the cutter-bar.

Referring to the drawings the reference numeral 1 indicates the drive wheel of my machine provided upon each of its opposite sides with an annular series of cam-projections 2, 2, and having trunnions 3, 3, projecting laterally from each side at its axial center. Upon said trunnions are supported the frame of the machine consisting of two side bars 4, 4, each provided at its rear end with a circular bearing by means of which they are loosely journaled upon the trunnions 3, 3, and at their forward ends are formed with elongated bed-plates 5, 5, which serve to support the finger bar 6, by means of which they are connected together and held in position upon the trunnions 3, 3. Each of said bed plates is provided upon its under side with a boss 7, formed integral therewith, said plate and boss being provided with a screw-threaded perforation in which is fitted an adjusting screw 8, upon the lower end of which is swiveled a journal box 9, a roller 10 being journaled in said boxes 9 immediately beneath and slightly in rear of the finger bar 6. The finger bar 6 is slightly angular in cross-section, as shown, in order that its fingers will be presented to the grass in a horizontal position. Upon said finger-bar, is supported a cutter-bar 11 made angular in cross-section to conform to the shape of the cutter-bar and provided upon its forward edge with knives 12. Instead of making the finger and cutter bars angular in cross-section I may make them curved in cross section. Said cutter bar is provided near each end with elongated slots 13 through which pass the adjusting screws 8. Upon said adjusting screws above the cutter bar 11, are loosely fitted boxes 14 which upon their under sides are provided with shoulders 15, 15, that project into the slots 13 of the cutter bar and rest upon the upper side of the finger bar 6. From the under side of the shoulders 15 project lugs 16 that rest in slots 17 formed in the upper side of the finger bar and serve to prevent the boxes from turning upon the adjusting screws or from being laterally displaced. Nuts 18 are screwed down over the adjusting screws 8 and serve to hold the boxes down to their seats. The boxes 14 are provided with extensions 19 that project over the upper face of the cutter bar, and are provided upon their under sides with recesses 20, within which are fitted so as to permit of a limited vertical play, caps or housings 21 having recesses 22 within which are loosely arranged friction rollers 23 that bear upon the upper side of the cutter-bar 11.

In the upper side of the caps or housings 21 are formed recesses 24 within which are seated the lower ends of adjusting screws 25, that are tapped through suitable screw-threaded perforations formed in the extensions 19, and by means of which said rollers are forced with the proper degree of pressure upon the cutter bar 11, to cause the latter to reciprocate in intimate contact with the finger bar. If desired the caps or housings 21 may be omitted, and the lower ends of the adjusting screws concaved or recessed under each of which is fitted a spherical roller 23ª that bears upon the upper side of the cutter bar in the same manner as the rollers 23, as clearly shown in Fig. 10.

To the cutter bar 11, near each end thereof, are secured rearwardly projecting pintles 26, upon which are pivoted or journaled dogs 27 that are bifurcated at their free ends and have journaled therein friction rollers 28 that are so arranged as to rest against the faces of the cam-projections 2, 2. Said dogs 27 are held in place upon their pintles 26 by keys or pins 29 passing through suitable perforations in said pintles, and said dogs are provided with shoulders 30 that are adapted to abut against said keys or pins when the dogs are thrown up out of engagement with the cams 2, 2, and prevent the dogs from being thrown so far sidewise that they cannot drop by gravity back into engagement with said cams, as will more fully hereinafter appear. In order to render the action of the dogs 27 noiseless as they drop idly over the cam projections onto the side bars 4, 4, I insert a cushion 34 of pig skin, hard wood or other suitable material in a recess in each of the bars 4, 4, at a point upon which the dogs bear, which receives the impact of the dogs.

The side bars 4, 4, at points in advance of their connection with the trunnions 3, 3, are provided with laterally projecting pivot pins 31, upon which are journaled the handle bars 32, which at their rear ends are bolted or otherwise suitably secured to the opposite sides of a handle 33. Owing to the handle bars being pivotally secured to the side bars 4, 4, in advance of the latter's connection to the drive wheel, the pressure exerted upon said handle to propel the machine forward will aid in causing the cutting mechanism to bear upon the ground and cut the grass to a uniform length. The handle bars 32 possess sufficient resiliency to enable them to be spread apart so as to allow them being sprung over their pivot pins 31 on the side bars 4, 4.

The operation of my invention will be readily understood. By propelling the machine in a forward direction the cam projections 2, 2, are caused to successively engage the free ends of the dogs 27 and owing to said dogs resting upon the side bars 4, 4, by which they are prevented from having any downward movement past the horizontal, said dogs are simultaneously reciprocated back and forth carrying with them the cutter bar 11. If the machine be drawn in the opposite direction the dogs will be raised by the cam projections and drop idly over them without communicating any motion to the cutter bar. The height of the cutting mechanism above the ground is regulated by turning the set screws 8 in the proper direction to raise or lower the same, as before described, while the cutter bar may be adjusted toward and from the finger-bar by turning the adjusting screws 25 in the proper direction to cause the friction rollers 23, or 23ª, to bear with more or less pressure upon the cutter bar. As before described, by pivoting the handle bars to the side bars of the frame in advance of the points of connection of the latter to the drive wheel, the force exerted upon the handle to propel the machine forward also serves to aid in holding the cutting mechanism in contact with the ground.

As before stated the frame consists of but two side bars 4, 4, that are journaled upon the trunnions of the drive wheel and connected together at their forward ends by the finger bar. The construction of the frame is thus greatly simplified and reduced to a minimum weight, while the employment of journal boxes, caps, and the like are entirely dispensed with, thus effecting economy in the cost of manufacture.

Having described my invention, what I claim is—

1. In a lawn mower, the combination with the drive wheel and the frame and finger bar carried thereby, of the slotted cutter bar supported upon said finger bar, adjusting screws freely passing through said cutter bar and through screw threaded perforations in said finger bar, bearings swiveled upon the lower ends of said adjusting screws, a roller journaled in said bearings, and nuts tapped over the upper ends of said adjusting screws, substantially as described and for the purpose specified.

2. In a lawn mower, the combination with the drive-wheel, the frame and finger bar carried thereby, of the slotted cutter bar supported upon said finger bar, adjusting screws engaging threaded perforations in the finger bar and loosely passing through the slotted portions of the cutter-bar, boxes arranged upon said adjusting screws above the cutter bar and provided with shoulders projecting through said slotted portions of the cutting bar and bearing against the upper side of the finger bar, and nuts tapped over the upper ends of said adjusting screws, substantially as described.

3. In a lawn mower, the combination with the drive wheel, the frame and finger bar carried thereby, of the slotted cutter bar supported upon said finger bar, adjusting screws engaging threaded perforations in the finger bar and loosely passing through the slotted portions of the cutter bar, boxes arranged upon said adjusting screws above the cutter bar and provided with shoulders projecting through said slots of the cutter bar and provided with lugs resting within slots formed in the upper side of the finger bar, and nuts for adjusting said boxes, substantially as described.

4. In a lawn mower, the combination with the drive wheel, the frame and the finger bar, of the slotted cutter bar supported upon said finger bar, adjusting screws carried by the finger bar and loosely passing through the slotted portions of the cutter bar, boxes arranged upon said adjusting screws, anti-friction rollers arranged between said boxes and
5 the cutter bar, and adjusting screws carried by the boxes for regulating the pressure of the rollers upon the cutter bars, substantially as described.

In testimony whereof I have hereunto set my hand and affixed my seal in presence of 10 two subscribing witnesses.

FLORENCE H. ZOHE. [L. S.]

Witnesses:
 VINTON COOMBS,
 GEO. W. REA.